UNITED STATES PATENT OFFICE.

JOHN T. COOKE, OF BROOKLYN, NEW YORK.

IMPROVEMENT IN COMPOUNDS FOR COATING ROASTED COFFEE.

Specification forming part of Letters Patent No. 131,852, dated October 1, 1872.

*To all whom it may concern:*

Be it known that I, JOHN T. COOKE, of Brooklyn, in the county of Kings and State of New York, have invented a new and Improved Compound for Coating Roasted Coffee; and I do hereby declare the following to be a full, clear, and exact description thereof, which will enable those skilled in the art to make and use the same.

This invention relates to a compound made of starch, gum-arabic, and essence of coffee, which, when applied to roasted coffee, prevents shrinkage, and protects the coffee against the moisture of the atmosphere, while at the same time my compound is cheap, and the increase in the weight of the coffee produced by its application more than compensates for the cost of the compound.

The ingredients which I use in preparing my compound are mixed together in about the following proportions: Starch, eight ounces; gum arabic, four ounces; essence of coffee, one ounce.

In order to mix these ingredients together, I dissolve the starch and the essence of coffee in boiling water, and the gum arabic in cold water. Then I mix the solution together and apply the same to the coffee during the operation of roasting or immediately after the coffee has been roasted and before it is cooled.

By applying my compound the coffee is protected against shrinkage, its weight is increased, and furthermore the roasted coffee is not liable to become damp, since my compound forms a coat on each bean which effectually excludes moisture.

I am aware that many experiments have been made to coat roasted coffee; for instance, sugar has been used and recommended for this purpose by Professor Liêbig, in Germany, for twenty years past; and also eggs have been used for this purpose more than thirty years, to my knowledge. The disadvantage of sugar, however, is, that this substance is hydroscopic—that is to say, it attracts moisture from the atmosphere, and the coffee coated with sugar is liable to become damp. The gelatinous matter contained in the eggs produces a good protective coat for the coffee; but the eggs are generally too expensive to be used with economy for coating coffee.

I do not claim, broadly, as my invention a compound for coating roasted coffee containing glutinous or gelatinous matter, since such is shown in John Arbuckle's patent of January 21, 1868; but

What I claim as new, and desire to secure by Letters Patent, is—

A compound made of the ingredients above described, and mixed together substantially in the manner and about in the proportion herein set forth.

This specification signed by me this 10th day of September, 1872.

JOHN T. COOKE.

Witnesses:
W. HAUFF,
E. F. KASTENHUBER.